No. 846,866. PATENTED MAR. 12, 1907.

C. SALLOWS.

DEVICE FOR KEEPING VEHICLE BOXES FROM ROCKING.

APPLICATION FILED JAN. 5, 1906.

Witnesses:

Inventor:
Charles Sallows
By O'Meara & Brock
Attorneys

UNITED STATES PATENT OFFICE.

CHARLES SALLOWS, OF CORDOVA, ILLINOIS.

DEVICE FOR KEEPING VEHICLE-BOXES FROM ROCKING.

No. 846,866.           Specification of Letters Patent.           Patented March 12, 1907.

Application filed January 5, 1906. Serial No. 294,802.

*To all whom it may concern:*

Be it known that I, CHARLES SALLOWS, a citizen of the United States, residing at Cordova, in the county of Rock Island and the State of Illinois, have invented a new and useful Improvement in Devices for Keeping Vehicle-Boxes from Rocking, of which the following is a specification.

This invention is an improved form of device to prevent wagon-bodies rocking or swinging back and forth as the said wagon-body moves vertically upon the vehicle-springs; and with the object of preventing such rocking movement my invention consists, essentially, in the employment of a lever pivotally connected to a bar which is rigidly secured to the bottom of the vehicle, the opposite ends of the lever having rods pivotally connected thereto, said rods extending in opposite directions and pivotally connected to the vehicle-axles, so that as the body moves vertically upon the vehicle-springs the rods operating upon the lever will cause said lever to oscillate, thereby taking up the motion which would otherwise be communicated to the vehicle-body.

The invention consists also in certain details of construction and novelty of combination, all of which will be fully described hereinafter and pointed out in the claims.

Figure 1:
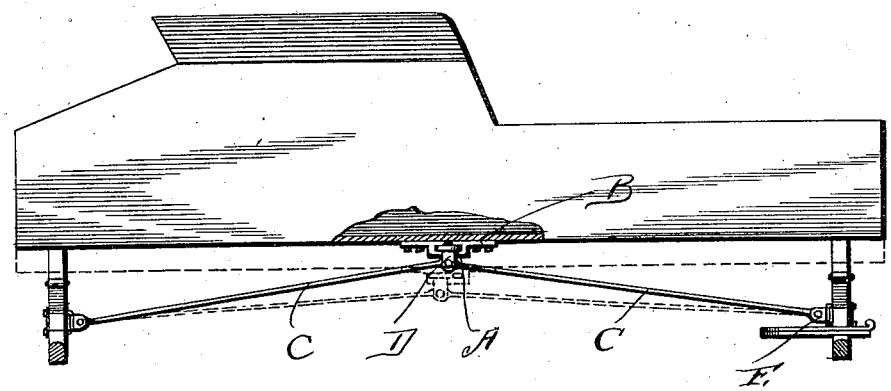
Figure 2:
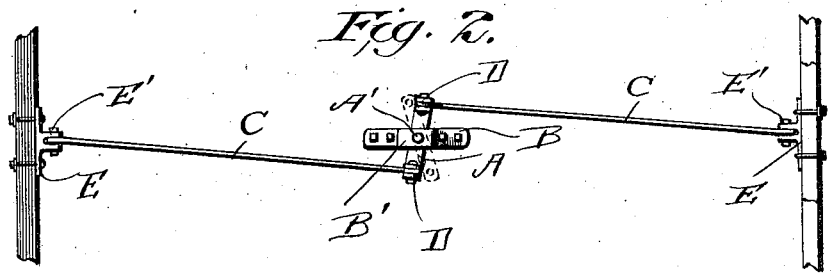
Figure 3:
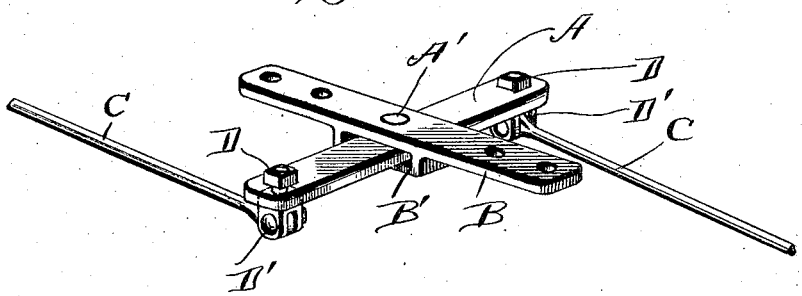

In the drawing forming a part of this specification, Figure 1 is a sectional elevation illustrating the practical application of my invention. Fig. 2 is an inverted plan view of the operating mechanism; and Fig. 3 is a detail perspective view of the lever and the means of connecting said lever to the wagon-body, said view also showing the connection between the said lever and the rods which lead to the axles of the vehicle.

In carrying out my invention I employ a lever A, which is made of stout flat metal and is pivotally connected to a bar B, which is constructed with a box-loop casting B', through which the lever passes, the pivot-pin A' extending through the lever and bar and pivotally connecting them together. The bar B is rigidly connected to the bottom of the vehicle, preferably to the center thereof. In practice the bar and box-loop will be cast in a single piece.

C C indicate equalizing-rods which are connected to the opposite ends of the lever A by means of swivel-bolts D, the lower ends of said bolts being bifurcated for the purpose of receiving the ends of the rods, and pivot-pins D' are passed through the said rods and the bifurcated ends of the bolts for the purpose of pivotally connecting them together. The opposite ends of the rods are pivotally secured between the ears E', formed integral with the plates E, which plates are securely bolted or otherwise secured to the front and rear axles of the vehicle. Thus it will be understood that as the vehicle-body moves vertically upon the vehicle-springs, as shown in dotted lines in Fig. 1, the equalizing-rods C, operating upon the lever at the opposite ends and from opposite directions, shift the position of the lever, as indicated in dotted lines in Fig. 2, and in this manner the backward-and-forward motion, which would otherwise be communicated to the vehicle-body, is taken up, and a backward-and-forward movement of said body is completely avoided.

It will be obvious that the rods C may be indirectly connected to the axle, as the front end can be pivotally connected either to the axle, a plate carried by the axle, a spring mounted upon the axle, or to a head-block.

Having thus fully described my invention, what I claim, and desire to secure by Letters Patent, is—

The combination with an apertured bar adapted to be secured to the bottom of a buggy, having a central box-loop provided with an opening in alinement with an opening in the bar, a pivoted pin mounted in said openings, a lever mounted on said pin in said box provided with apertured ends, bolts pivotally mounted in the aperture in the end of the lever provided with bifurcated ends, the walls of which are apertured, pintle-pins mounted in said apertures, plates secured to the front and rear axle provided with apertured ears having pins arranged therein, and rods provided with eyes at their ends mounted on said pins, and the pins of the bifurcated bolts, for the purpose described.

CHARLES SALLOWS.

Witnesses:
   FRANK S. COOL,
   LEWIS D. MARSHALL.